United States Patent [19]

Padovani et al.

[11] Patent Number: 5,396,516
[45] Date of Patent: Mar. 7, 1995

[54] METHOD AND SYSTEM FOR THE DYNAMIC MODIFICATION OF CONTROL PAREMETERS IN A TRANSMITTER POWER CONTROL SYSTEM

[75] Inventors: Roberto Padovani; Noam Ziv, both of San Diego, Calif.

[73] Assignee: Qualcomm Incorporated, San Diego, Calif.

[21] Appl. No.: 20,482

[22] Filed: Feb. 22, 1993

[51] Int. Cl.⁶ ........................................... H04B 17/00
[52] U.S. Cl. ..................................... 375/225; 370/84; 455/69
[58] Field of Search ................. 375/1, 8, 10, 121; 370/84; 455/54.1, 69; 341/61

[56] References Cited

U.S. PATENT DOCUMENTS

| | | | |
|---|---|---|---|
| 4,309,771 | 1/1982 | Wilkens | 385/58 |
| 4,512,033 | 4/1985 | Schrock | 455/69 |
| 4,639,914 | 1/1987 | Winters | 455/69 |
| 4,868,795 | 9/1989 | McDavid et al. | 455/69 |
| 4,901,307 | 2/1990 | Gilhousen | 375/18 |
| 5,056,109 | 10/1991 | Gilhousen | 375/1 |
| 5,128,965 | 7/1992 | Henriksson | 375/58 |
| 5,216,692 | 6/1993 | Fuyun | 375/1 |
| 5,224,120 | 6/1993 | Schilling | 375/1 |
| 5,257,283 | 10/1993 | Gilhousen et al. | 375/1 |
| 5,265,119 | 11/1993 | Gilhousen et al. | 455/69 |
| 5,297,161 | 3/1994 | Ling | 375/1 |
| 5,299,226 | 3/1994 | Schilling | 375/1 |

Primary Examiner—Stephen Chin
Assistant Examiner—Young Tse
Attorney, Agent, or Firm—Russell B. Miller

[57] ABSTRACT

In a communication system in which direct sequence spread spectrum modulation techniques are used interference is generated in communications by remote stations since the communications share the same frequency spectrum. In order to increase system capacity the power level of the remote station transmitters are controlled by the local station. A setpoint is generated by the local station and compared with the remote station signal strength measured at the local station. The result of this comparison is used to generate power level adjustment commands which are sent to the remote station. The remote station is responsive to the power level adjustment commands for increasing or decreasing remote station transmitter power. In a spread spectrum communication system in which data is encoded at variable data rates, the local station determines the rate at which received data was encoded by the transmitting remote station. The data is decoded at each possible rate with error metrics generated that are representative of the quality of the data decoded at each rate. A rate decision algorithm is used to evaluate the error metrics and make a decision on the rate at which the data was transmitted. A pattern match of rate decisions is used to modify a setpoint so as to closely control the transmitting power of the remote station as a function of the quality of the received data.

22 Claims, 5 Drawing Sheets

METHOD AND SYSTEM FOR THE DYNAMIC MODIFICATION OF CONTROL PAREMETERS IN A TRANSMITTER POWER CONTROL SYSTEM

BACKGROUND OF THE INVENTION

1. Field of the Invention

The present invention relates generally to digital communication systems and, more specifically, to a method and apparatus for adjusting transmitter power in such systems both to minimize interference among transmitters operating simultaneously and to maximize the quality of individual communications.

2. Description of the Related Art

In a cellular telephone or personal communication system (PCS), a large number of "mobile stations" communicate through cell sites or "base stations.". The transmitted signal experiences multipath fading as the mobile station moves in relation to features in the environment that reflect the signal. Controlling mobile station transmitter power to overcome multipath fading is described in U.S. Pat. No. 5,056,109, titled "METHOD AND APPARATUS FOR CONTROLLING TRANSMISSION POWER IN A CDMA MOBILE CELLULAR TELEPHONE SYSTEM," issued on Oct. 8, 1991 to the assignee of the present invention and incorporated herein by reference.

If the mobile station transmits an excessively powerful signal, it will interfere with the transmitted signals of other mobile stations. If the mobile station transmits an insufficiently powerful signal, the base station will be unable to recover the transmitted information from the received signal. In the above-referenced patent, the base station measures the power of the signal received from a mobile station and transmits power adjustment commands to the mobile station over a separate channel. The commands instruct the mobile station to increase or decrease transmission power to maintain the average received signal power at a predetermined level. The base station must periodically adjust the transmission power of the mobile station to maintain an acceptable balance between interference and signal quality as the mobile station moves.

The base station processor may monitor error rates in the received signal to select an optimal power level at which to maintain the average received signal. The base station processor detects errors as disclosed in copending U.S. Patent application Ser. No. 08/079,196, titled "METHOD AND APPARATUS FOR DETERMINING DATA RATE OF TRANSMITTED VARIABLE RATE DATA IN A COMMUNICATIONS RECEIVER," and assigned to the assignee of the present invention. In the exemplary CDMA cellular telephone system described in the above-referenced U.S. patent and copending application, the mobile station transmits "frames" comprising "symbols," which represent digitized voice or other data. Further details on the exemplary CDMA cellular telephone system are described in U.S. Pat. No. 5,103,459, titled "SYSTEM AND METHOD FOR GENERATING SIGNAL WAVEFORMS IN A CDMA CELLULAR TELEPHONE SYSTEM," issued Apr. 17, 1992 to the assignee of the present invention and incorporated herein by reference.

The mobile station encodes frames at one of four rates; the rate is selected according to the needs of the user. The maximum rate, which is generally preferred for high quality voice transmissions or rapid data transmissions, is called "full rate." Rates of one half, one fourth, and one eighth of the full rate are called "half rate," "quarter rate," and "eighth rate," respectively. Each symbol of a frame to be encoded at half rate, quarter rate, and eighth rate is repeated two, four, and eight times, respectively, to fill the frame. The frame is then transmitted to the base station at a constant rate, regardless of the rate at which the symbols are encoded.

The base station has no advance notice of the data rate at which a received frame is encoded and the rate may be different from that of the previous received frame. The base station decodes each received frame at each of the four rates and produces a set of error metrics corresponding to each rate. The error metrics provide an indication of the quality of the received frame and may include a cyclic redundancy check (CRC) result, a Yamamoto Quality Metric, and a re-encoded symbol comparison result. The generation and use of these error metrics are well known in the art with details on the Yamamoto Quality Metric provided in the article "Viterbi Decoding Algorithm for Convolutional Codes with Repeat Request", Hirosuke Yamamoto et al., *IEEE Transactions on Information Theory*, Vol. IT-26, No. 5, September 1980. The set of error metrics for the decoding of each frame at each rate thus includes one or more of the CRC result, the Yamamoto Quality Metric, and the re-encoded symbol comparison result. The base station processor analyzes the sets of error metrics using a novel decision algorithm and determines the most probable rate at which the received frame was encoded. The base station then uses the rate decision to select the corresponding decoded data from the multiple data rate decodings to recover the transmitted frame information.

The base station processor also produces an "erasure" indication if the quality of the frame data is too poor for the processor to determine the rate. Similarly, the processor produces a "full rate likely" indication if bit errors exist in the data but the rate is probably full rate. If an erasure occurs, the base station may simply discard the frame or may replace it with interpolated data.

It would be desirable to monitor the error rate of the received frames and to periodically adjust the transmission power level to maintain the error rate at an acceptable value. These problems and deficiencies are clearly felt in the art and are solved by the present invention in the manner described below.

SUMMARY OF THE INVENTION

The present invention comprises a method and apparatus for adjusting the power level of a remote transmitter to provide a substantially constant error rate in the received data. The present invention may be used in the base station of a cellular telephone system to maximize the number of mobile stations that may transmit simultaneously with minimal interference by enhancing control over the power of the signal that each mobile station transmits.

In the CDMA cellular telephone system described in the above-referenced U.S. patent, the mobile station transmits a signal comprising frames of digitized voice or other information to the base station at an initial power level or setpoint. As described in the above-referenced copending application, the information is encoded into either full rate, half rate, quarter rate, or eighth rate data frames. The base station receives the signal and decodes each frame at each of these rates. A corresponding set of error metrics is produced for each rate that provides an indication of the quality of the received information if the frame is decoded at that rate. The base station processor then analyzes the sets of error metrics using a decision algorithm and either provides an indication of the most probable rate at which the information was encoded or provides an "erasure" indication, i.e., an indication that the rate could not be determined with the desired probability of correctness.

In the present invention, the base station processor counts the number of consecutive frames encoded at a rate such as full rate and the number of frames that are erasures. A count of a predetermined number of consecutive full rate indications, i.e., without an intervening less than full rate indication, erasure indication or full rate likely indication, is indicative of a high quality full rate transmission and is called a "full rate run." If the processor detects a full rate run and then detects an additional full rate frame, it should decrease the signal power to a level at which a small but acceptable number of erasure or full rate likely indications occur between the full rate frames. For example, one error indication in 100 full rate frames, where each frame consists of 576 symbols and is transmitted at a rate of 28,800 symbols per second, is inaudible in a transmission consisting of ordinary speech.

A count of a predetermined number of consecutive erasure indications, i.e., without an intervening other rate indication, is indicative of a poor quality transmission and is called an "erasure run." If the processor detects an erasure run, it should increase the signal power. The increased signal power may overcome multipath fading, thereby reducing the erasure rate.

A predetermined consecutive number of half rate, quarter rate, or eighth rate indications is called a "variable rate run." As a further enhancement in controlling transmitter power the processor may, while in a variable rate run, also reduce the signal power if it detects a half rate, quarter rate, or eighth rate indication. In addition while in the variable rate run, the processor may increase the signal power if it detects an erasure indication.

Although the present invention may be used to adjust the power level of transmissions consisting of any type of data, it is optimized for transmissions consisting of voice information. In communications systems such as the cellular telephone system described in the above-referenced copending application and U.S. patent, voice transmissions are encoded at a variable rate; the complexity of the speech determines the rate. However, continuous speech is generally encoded at full rate. Speech occurring after a period of relative inactivity may be encoded at lower rates, transitioning to full rate as the speech increases in complexity. The algorithm thus expects to detect variable rate runs alternating with full rate runs as the speaker pauses between words or syllables. Therefore, the processor may also increase the signal power if it detects an erasure indication or a full rate likely indication following a full rate run. The increment by which the processor increases the power upon detecting an erasure or full rate likely indication following a full rate run need not be the same as the increment by which the processor increases the power upon detecting an erasure run.

The foregoing, together with other features and advantages of the present invention, will become more apparent when referring to the following specification, claims, and accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a CDMA cellular communication system where system user capacity is a function of the total system power, any reduction of mobile station power facilitates an increase in system capacity. The present invention provides a method and system for closely and dynamically controlling the mobile station transmitter power as a function of the communication link. Through dynamic control over mobile station transmitter power greater system capacity may be achieved.

Figure 1:
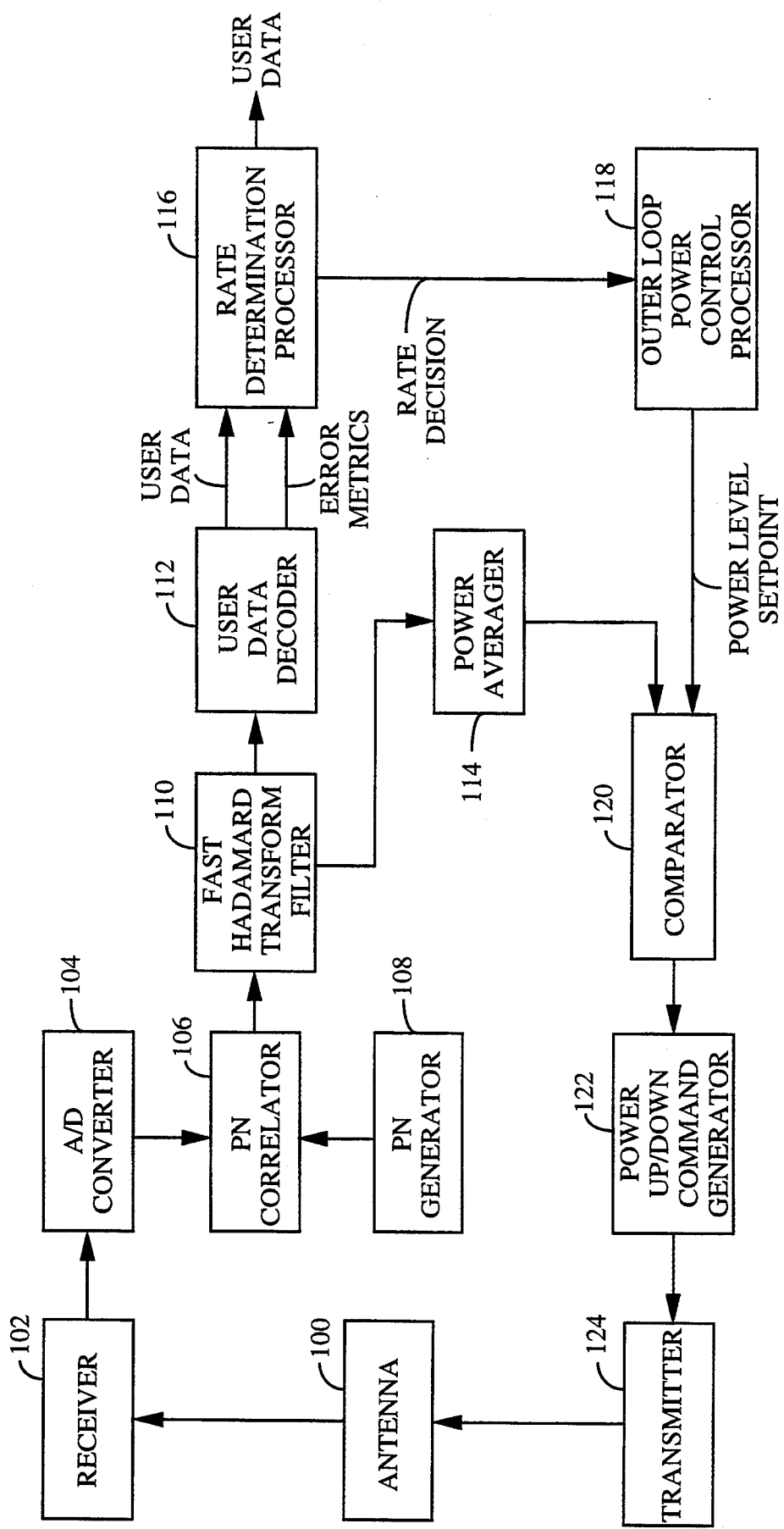
FIG. 1 is a block diagram showing the present invention in the base station receiver of a cellular telephone system.

In FIG. 1, the present invention is used in a base station receiver of a CDMA cellular telephone system. This receiver is described in the above-referenced U.S. Patent and is now described only briefly. A mobile station (not shown) transmits a communication signal, typically a CDMA signal of a spreading bandwidth for example of 1.25 MHz at one frequency band, to the base station radio receiver (not shown).

In order to aid in understanding of the present invention, a brief discussion of the mobile station data encoding for transmission is provided. In the exemplary embodiment user data provided at various data rates is encoded and formatted for transmission in data frames typically 20 milliseconds in length. The user data along with frame overhead data are preferably forward error correction encoded the effective data rates for this example are 9.6 kbps (full rate), 4.8 kbps (half rate), 2.4 kbps (quarter rate) and 1.2 kbps (half rate). It should be noted that a constant symbol rate for the frames is preferred but is not necessary.

In this example rate $\frac{1}{3}$ convolutional encoding is used to produce three symbols for each user data or frame overhead bits. For a full rate frame, corresponding to a 9.6 kbps data rate, a total of 192 user data and frame overhead bits are encoded to produce 576 symbols for the frame. For a half rate data frame, corresponding to a 4.8 kbps data rate, a total of 96 user data and frame overhead bits are encoded to produce 288 symbols for the frame. Similarly for quarter rate and eighth rate data frames, respectively corresponding to 2.4 and 1.2 kbps data rates, a total of 48 and 24 user data and frame overhead bits are encoded to produce 144 and 72 symbols for the respective rate frame. It should be noted that groups of symbols are converted into a respective orthogonal function sequence or code of a set of orthogonal function codes according to the value of the symbol set. In the exemplary embodiment six symbols for a binary value that is used to select one of sixty-four Walsh function sequences each sixty-four chips in length. Further details on this modulation scheme is disclosed in the above mentioned U.S. Pat. No. 5,103,459.

At the base station the signal is received at antenna 100 and provided to receiver 102 for frequency downconversion and filtering. Analog-to-digital (A/D) converter 104 receives the analog spread spectrum signal from receiver 102 and converts it to a digital signal. A pseudorandom noise (PN) correlator 106 receives the digital signal and a PN code provided by a PN generator 108. PN correlator 106 performs a correlation process and provides an output to a Fast Hadamard Transform digital processor or filter 110.

In a preferred embodiment of a multipath diversity receiver PN generator 108 generates a plurality of a same PN codes with timing offsets dependent upon the particular path of the signal. PN correlator 106 correlates each of the PN codes with a respective path signal to produce a respective orthogonal function symbol data. Filter 110 converts the orthogonal function symbol data into soft decision symbol data for each multipath signal. The multipath symbol data is then combined and provided as soft decision symbol data for decoding by user data decoder 112.

Filter 110 as part of the conversion process determines from each orthogonal function symbol from each multipath signal an energy value. Keeping in mind that each orthogonal function symbol is converted into a group of data symbols, the energy values from the different paths are combined to produce a corresponding symbol energy value. Filter 110 in addition to providing soft decision data to decoder 112, also provides the symbol energy value to power averager circuit 114.

Decoder 112, which typically includes a Viterbi decoder, receives the filter soft decision symbol data output and produces user data and decoder error metrics which are provided to rate determination processor 116. Processor 116 may send the user data to a digital-to-analog converter or other output circuitry (not shown). Decoder 112 is described in further detail in the above-referenced copending U.S. Patent application and is only briefly described herein.

Upon reception at the base station, decoder 112 decodes each frame at each possible rate and provides a corresponding set of error metrics representative of the quality of the symbols as decoded at each rate. Error metrics for decodings at each rate include, for example, a symbol error result based upon a re-encoding of the decoded bits to produce re-encoded symbols that are and then compared with the received symbols and a Yamamoto Quality metric. In addition, for full rate and half rate frames a CRC check result is performed on CRC bits in the frame overhead bits.

After decoder 112 has decoded each frame, processor 116 executes the rate determination algorithm described in the above-referenced copending U.S. Patent application to determine the most likely rate at which the frame was encoded. The algorithm uses the error metrics provided by decoder 112 to estimate or decide the rate at which the frame of data was transmitted. Once processor 116 determines the rate for the frame of data, the data is interpreted by control bits included in the frame as either control or user data with the user data output for further use. From the error metrics processor 116 determines whether the received data frame contained data that was transmitted at either full rate, half rate, quarter rate or eighth rate and generates a corresponding rate indication. This rate indication is provided to outer loop power control processor 118, whose function is described in further detail later herein.

In the case where the error metrics provided by decoder 112 indicate to processor 116 that the received frame was corrupted beyond that which the error correction techniques employed by decoder 112 may correct, processor 116 does not decide the rate of the data for the frame. Processor 116 in this case does not use or provide an output of the data for that frame, with the frame being considered an erasure frame. Processor 116 for the erasure frame, generates and provides an erasure indication to processor 118 indicative that could not determine the rate at which the frame was encoded.

In the case where the error metrics provided by decoder 112 indicate to processor 116 that the received frame is a corrupted full rate frame that was corrected by decoder 112. Typically in this case the metrics indicate only that an error exists in the CRC. From this information processor 116 determines that the most likely rate of the data for the frame is that of full rate, and identifies the frame as a full rate likely frame. Processor 116 uses or outputs the data as if it were full rate data with a conditional understanding that it may contain errors. Processor 116 for the full rate likely frame generates and provides a full rate likely indication to processor 118.

The rate decisions and detected frame errors may be used as an indication of the power level at which the mobile station need transmit signals at to maintain a quality communication link. In those cases where a number of frames are received at a rate or rates in which the occurrence of frames in error is low, the mobile station transmitter power may be reduced. This transmitter power reduction may continue until the error rate begins to rise to a level which may adversely affect the quality of the communication link. Similarly the power may be increased where the errors adversely affect the quality of the communication link.

Upon receiving the rate indications from processor 116, processor 118 executes a novel algorithm to control a power level setpoint. This setpoint is used as discussed with reference to FIG. 1 in generating power commands which control the power of the mobile station transmitter power.

As mentioned previously filter 110 provides the scaled symbol energy value to power averager 114. Power averager 114 sums or averages the scaled symbol energy values over a 1.25 millisecond interval, i.e. corresponding to a group of six Walsh symbols or thirty-six data symbols, and provides a received power level signal to comparator 120.

Processor 118, which includes appropriate internal counters, program memory and data memory, computes under program control a power level setpoint signal as described below and provides it to comparator 120. Processor 118 may be either located at the base station through which the mobile station is in communication with or at a remote location such as the mobile telephone switching office (not shown). In the situation where the mobile station is communicating through multiple base stations, with power control provided through the multiple base stations, from a control standpoint the location of processor 118 at the MTSO is more convenient. In those situations where processors 116 and 118 are located together the function of these two processors may be combined into a single processor.

Comparator 120 compares the received power level signal and the power level setpoint signal, and provides a deviation signal representative of the deviation of the received power from the power level setpoint set by processor 118. Power up/down command generator 122 receives the deviation signal and generates either a power up command or a power down command, which the base station transmits to the mobile station (not shown). Should the signal from power averager circuit 114 fall below the threshold established by the power level setpoint signal, the deviation signal generated by comparator results in the generation of power up command. Similarly, should the power averager circuit signal exceed the power level setpoint signal, a power down command is generated. These power commands are provided to transmitter 124 where inserted into the data being transmitted to the mobile station. Transmitter spread spectrum modulates and transmits the modulated data via antenna 100 to the mobile station. Transmitter 124 typically transmits the CDMA signal in a different frequency band than the mobile station transmission but of the same spreading bandwidth, e.g. 1.25 MHz.

Figure 2:
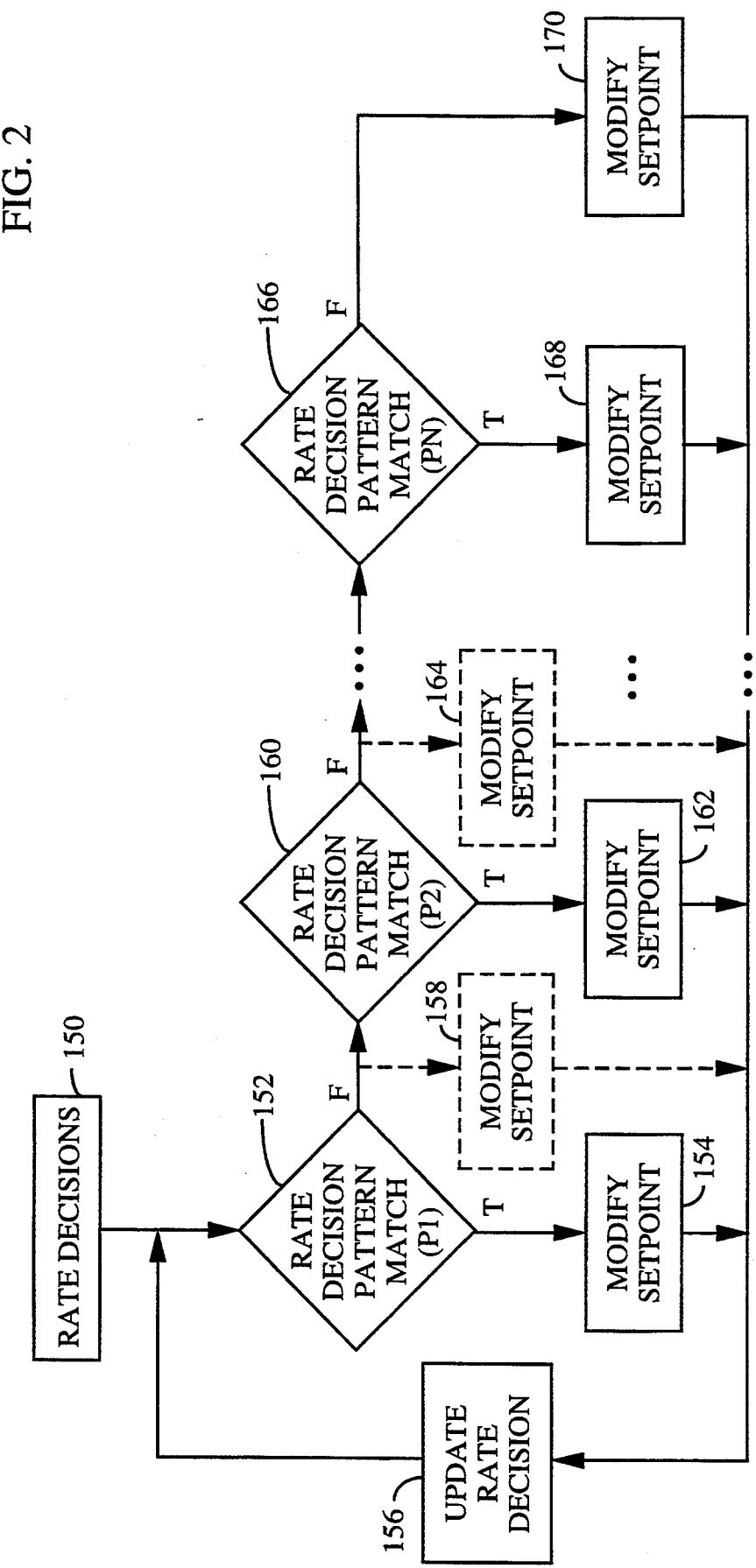
FIG. 2 is a generalized flow diagram of an exemplary power control setpoint algorithm.

FIG. 2 illustrates a generalized flow diagram of this algorithm used to dynamically adjust the power level setpoint, and thus indirectly modify the mobile station transmitter power. The implementation of the algorithm seeks to effect a reduction or increase in the mobile station transmitter power as a function of the link quality with respect to various frame rate data. In this implementation a pattern of rate decisions is used to modify the power level setpoint. Although the exemplary embodiment is described with reference to using the rate decision as an indicator of patterns, other parameters may be used.

In FIG. 2, a group of one or more of frame rate decisions is provided for inspection, step 150. This group may be comprised of a collection of sequential frame rate decisions, or according to some other order, and/or which may be dependent upon the frame rate. The group of rate decisions are inspected to determine if their pattern is matched to predetermined rate decision pattern $P_1$, step 152. If there is a pattern match, a modification in the power level setpoint is made, step 154. This modification may be in the form of an increase or decrease in the power level setpoint by an incremental value. This increase or decrease in the power level setpoint ultimately results in a corresponding increase or decrease in the mobile station transmitter power. In those cases where a rate decision pattern match indicates a good communication link, the power level setpoint is increased to result in the generation of power down commands and ultimately a decrease in mobile station transmitter power. Similarly, in those cases where a rate decision pattern match indicates a low quality communication link, the power level setpoint is increased to result in the generation of power up commands and ultimately an increase in mobile station transmitter power.

Should a pattern match occur with a modification of the setpoint, steps 152 and 154, a rate decision is updated, step 156, and the process repeated. Further details on the update aspect of the invention are discussed later.

In the event that pattern determination step 152 results in no pattern matching, the process may proceed under several options. In one option the power level setpoint may be modified, step 158, the rate decision updated, step 156, and the process repeated. The modification in step 158 is preferably a different modification from that of step 154 (increase vs. decrease or vise versa) where a pattern match was detected. It should also be noted that any setpoint modification as discussed herein may also be set to provide no change in the setpoint.

In a preferred implementation should pattern determination step 152 result in no pattern matching, at least one additional pattern determination step is performed. For example, the group of rate decisions are inspected to determine if their pattern is matched to another predetermined rate decision pattern $P_2$, step 160. If there is a pattern match, a modification in the power level setpoint is made, step 162. This modification may be in the form of an increase or decrease in the power level setpoint by an incremental value, or the setpoint is left unchanged. This increase or decrease in the power level setpoint ultimately results in a corresponding increase or decrease in the mobile station transmitter power. As was for the case of step 152 where no pattern match occurred, should there be no pattern match in step 160 the setpoint may be modified or left unchanged, step 164.

In the case where no pattern match occurs in step 160 additional pattern match determinations and setpoint modifications may be performed. Should there be no pattern match in each of these pattern match determinations a final or $N^{th}$ pattern match determination is made. The group of rate decisions are inspected to determine if their pattern is matched to yet another predetermined rate decision pattern PN, step 166. If there is a pattern match, a modification in the power level setpoint is made, step 168. This modification may be in the form of an increase or decrease in the power level setpoint by an incremental value, or the setpoint is left unchanged. This increase or decrease in the power level setpoint ultimately results in a corresponding increase or decrease in the mobile station transmitter power. As was for the case of steps 152 and 160 where no pattern match occurred, should there be no pattern match in step 166 the setpoint may be modified or left unchanged, step 170.

The process steps of FIG. 2 are repeated generally with an updated group of rate decisions with the updating accomplished in step 156. This updated group may be comprised of the previous group with the addition of a new frame rate decision and the deletion of the oldest frame rate decision using well known memory techniques. In the alternative, the group may be comprised of any collection of rate decisions as may be desired.

It should be noted that the selected pattern typically defines whether an increase or decrease in the power level setpoint is necessary. Increase and decrease increments of the power level setpoint may be of different incremental quantities for the various pattern matches, but they may also be of the same incremental quantity. Furthermore pattern $P_1$, as may patterns $P_2$ through $P_N$, may each encompass a set of patterns to facilitate a modification associated with the pattern. Further a modification of the setpoint, such as in step 154, may be different depending upon the pattern of the set of patterns that is matched in the pattern determination step. It should also be noted that the setpoint may be modified by a zero incremental quantity such that the setpoint is effectively unchanged.

The use of different pattern match determinations permits greater flexibility in adjusting the mobile station transmitter power level according to the quality of the communication link. For those cases where link quality is above that which is necessary to support reliable communications, transmission power may be reduced to the minimum necessary to maintain a reliable communication link. Similarly in those cases where link quality is below that which is necessary to support reliable communications, transmission power may be increased to a level necessary to maintain a reliable communication link.

Figure 3A:
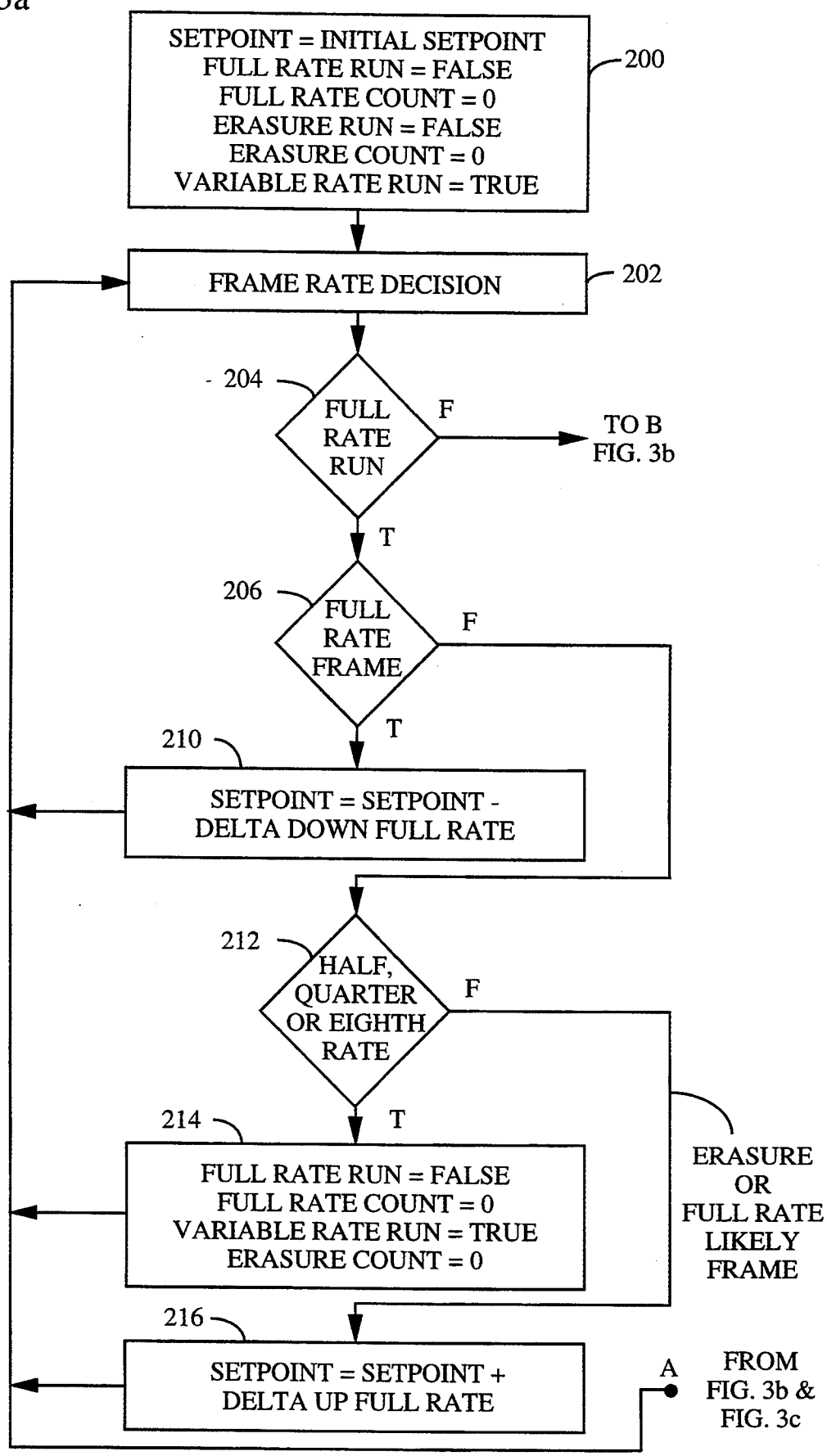
FIGS. 3a-3c illustrate a detailed flow diagram of an exemplary power control setpoint algorithm for a determined rate decision pattern.
Figure 3B:
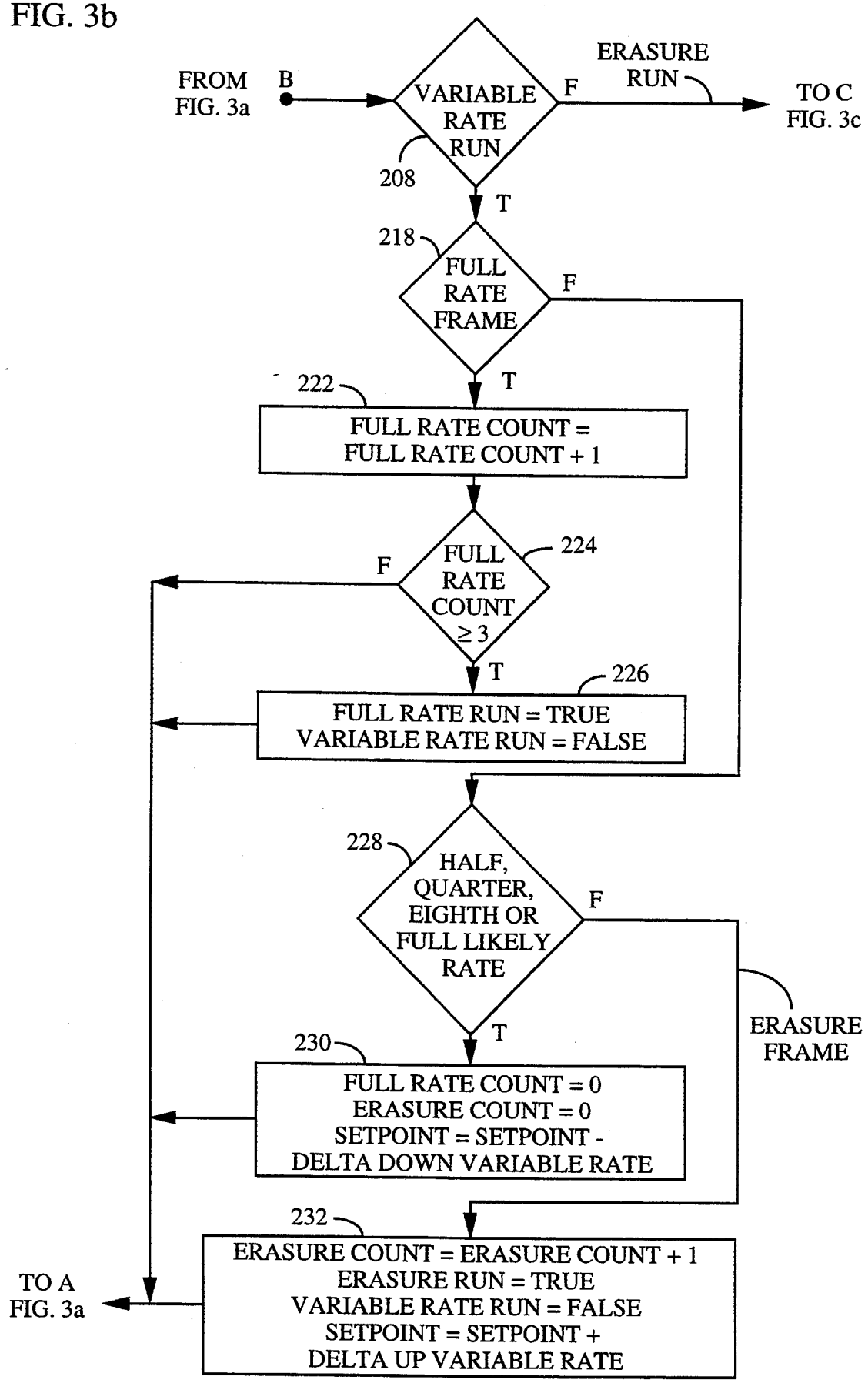
Figure 3C:
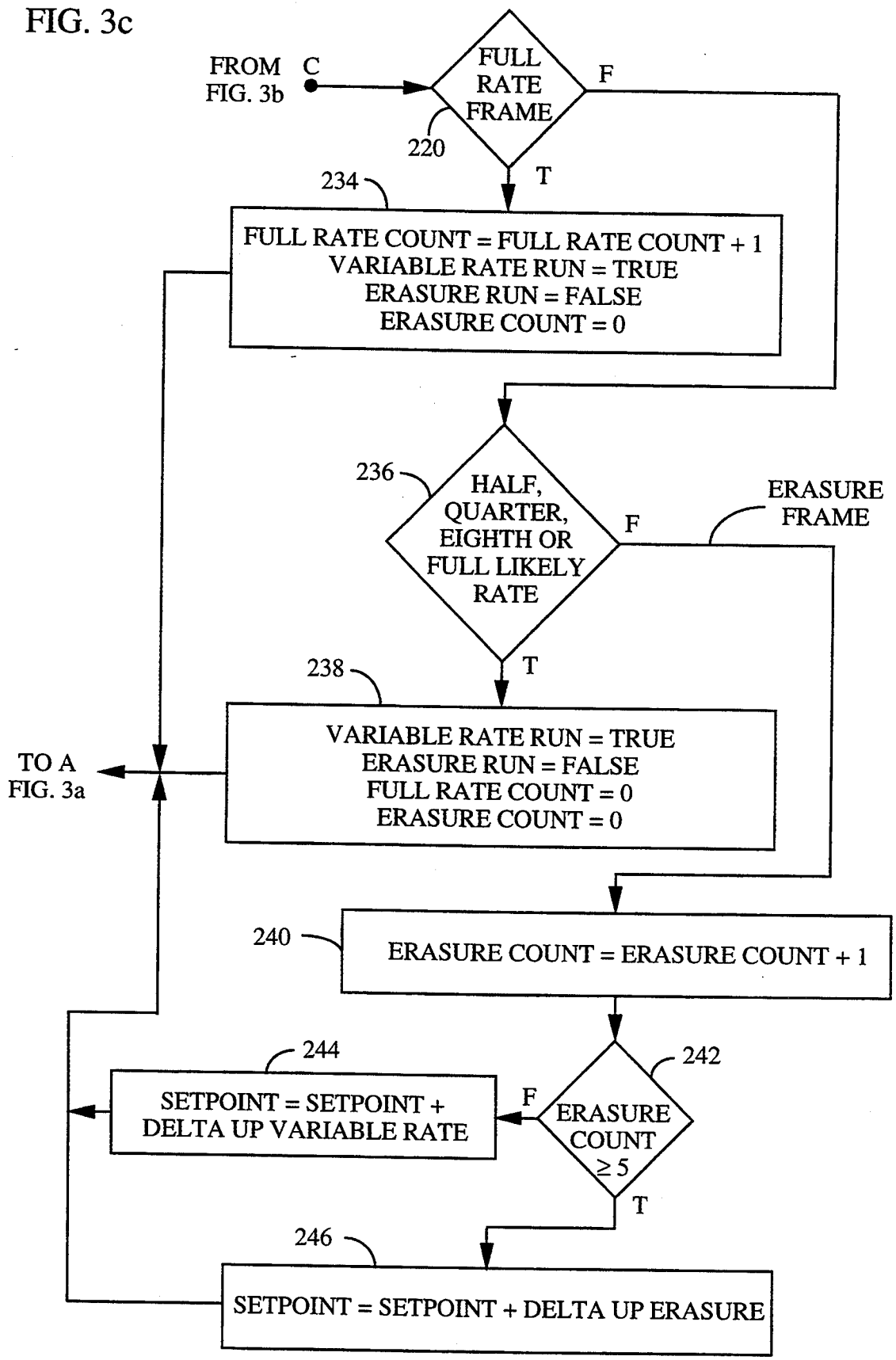

FIGS. 3a–3c illustrates a detailed example of the use of rate decision pattern in controlling adjustment of the mobile station transmitter power. In FIG. 3a, if the frame is the first frame of a transmission, processor 118 (FIG. 1) initializes variables at step 200. Processor 118 sets "Setpoint," which represents the power level setpoint signal, to an initial value "Initial setpoint." Processor 118 changes the power level setpoint signal, and ultimately the mobile station power level when it changes the variable "Setpoint."

Processor 118 has counters "Full Rate Count" and "Erasure Count," which represent the number of consecutive full rate indications and the number of erasure indications, respectively. These counters are initialized to zero at step 200. A full rate run consists of three consecutive full rate indications; an erasure run consists of one erasure indication; and a variable rate run consists of one half rate indication, one quarter rate indication, or one eighth rate indication. Processor 118 sets boolean variables "Full Rate Run," "Erasure Run," and "Variable Rate Run," which indicate a state of the process, to a value of FALSE at step 200. The setting of these variables to FALSE is indicative of an initial process state.

Processor 118 waits at step 202 until processor 116 has produced a rate decision. At step 204, processor 118 branches to step 206 if "Full Rate Run" is true and to step 208 (FIG. 3b) if false.

At step 206, processor 118 branches to step 210 if the rate decision is a full rate indication and to step 212 if it is not a full rate indication. At step 210, processor 118 decreases "Setpoint" by an amount equal to a value "Delta Down Full Rate." At step 212, processor 118 branches to step 214 if the rate decision is a half rate indication, a quarter rate indication, or an eighth rate indication and to step 216 if the rate decision is an erasure or full rate likely indication.

At step 214, processor 118 sets "Full Rate Run" to a value of FALSE, "Variable Rate Run" to a value of TRUE, and both "Full Rate Count" and "Erasure Count" to a value of zero. At step 216, processor 118 increases "Setpoint" by an amount equal to a value "Delta Up Full Rate." Processor 118 returns to step 202 to wait for the next rate decision after it executes step 210, 214, or 216.

At step 208, processor 118 branches to step 218 if "Variable Rate Run" is true and to step 220 if false. The transition to step 220 from step 208 is by default an indication of the "Erasure Run" variable is true. At step 218, processor 118 branches to step 222 if the rate decision is a full rate indication and to step 228 if it is not a full rate indication. At step 222, processor 118 increments "Full Rate Count" and proceeds to step 224. At step 224, processor 118 branches to step 226 if "Full Rate Count" is greater than three and to step 202 to wait for the next rate decision if "Full Rate Count" is less than or equal to three. At step 226, processor 118 sets "Full Rate Run" to a value of TRUE and "Variable Rate Run" to a value of FALSE and then proceeds to step 202 to wait for the next rate decision.

At step 228, processor 118 branches to step 230 if the rate decision is a half rate indication, a quarter rate indication, an eighth rate indication, or a full rate likely indication, and to step 232 if the rate decision is an erasure indication. At step 230, processor 118 sets "Full Rate Count" and "Erasure Count" to zero and proceeds to step 202 to wait for the next rate decision. In step 230, the "Setpoint" may also be decreased by an amount equal to a value "Delta Down Variable Rate" to achieve greater power level setpoint control. At step 232, processor 118 increments "Erasure Count," sets "Erasure Run" to a value of TRUE, and "Variable Rate Run" to a value of false, and then proceeds to step 202 to wait for the next rate decision. Furthermore, in order to achieve greater power level setpoint control, the "Setpoint" may be increased by an amount equal to a value "Delta Setpoint Up Variable Rate" in step 232. Processor 118 then proceeds to step 202 to wait for the next rate decision.

The transition to step 220 from step 208 results from "Variable Rate Run" being set false and "Erasure Run" being set true in step 232. Although the "Erasure Run" state is not directly used in a decision step for entering step 212, which it could be, it is used in this example as identifying the state in which the process is in. At step 212 processor 118 branches to step 234 if the rate decision is a full rate indication and to step 236 if it is not a full-rate indication. At step 234, processor 118 increments "Full Rate Count," sets "Variable Rate Run" to a value of TRUE, "Erasure Run" to a value of FALSE, and "Erasure Count" to a value of zero, then proceeds to step 202 to wait for the next rate decision. At step 236, processor 118 branches to step 238 if the rate decision is a half rate indication, a quarter rate indication, an eighth rate indication, or a full rate likely indication, and to step 240 if the rate decision is an erasure indication.

At step 238, processor 118 sets "Variable Rate Run" to a value of TRUE, "Erasure Run" to a value of FALSE, and both "Full Rate Count" and "Erasure Count" to a value of zero, then proceeds to step 202 to wait for the next rate decision. At step 240, processor 118 increments "Erasure Count" and proceeds to step 242.

At step 242, processor 118 branches to step 244 if "Erasure Count" is less than five. In step 244 the "Setpoint" is increased by an amount equal to a value "Delta Up Variable Date" and returns to step 202 to wait for the next rate decision. The adjustment of the "Setpoint" in step 244 provides for enhanced control over the power level setpoint upon the occurrence of several erasure frames.

However should additional consecutive erasure frames occur it is desirable to increase the setpoint by a greater value in an attempt to eliminate the occurrence of more erasure frames. At step 242, processor 118 branches to step 246 if "Erasure Count" is greater or equal to five. At step 246, processor 118 increases "Setpoint" by an amount equal to a value "Delta Up Erasure" and returns to step 202 to wait for the next rate decision. In the exemplary embodiment the value "Delta Up Erasure" is greater than the value "Delta Up Variable Date".

In a modification of the present invention the adjustment of the "Setpoint" in step 244 may be omitted. When the "Erasure Count" is less than the count value in step 242, then no adjustment is made to "Setpoint" Since less control is provided over the power level setpoint for the run of erasure flames, it is desirable that the count value be reduced to enable the adjustment in step 246 to occur sooner. For example the value may be reduced to a value of two or three.

In an exemplary execution of the power control algorithm, processor 118 initializes variables at step 200 and waits at step 202. The base station receives the first frame of a transmission and generates error metrics. Power averager 114 measures the power of the symbols over a 1.25 millisecond interval and updates its output ever 1.25 milliseconds while decoder 112 decodes the frame. Processor 116 produces a rate decision in response to the error metrics. When processor 116 has produced the rate decision, processor 118 branches via steps 204 and 208 to step 218 because the algorithm initially begins in a variable rate run.

Frames in a voice transmission generally fluctuate between full rate and other rates, with continuous speech being encoded at full rate. If, for example, processor 116 produces an eighth rate indication in response to the first frame, processor 118 branches from step 218 to step 228 and proceeds to step 230. Because the frame was neither an erasure nor a full rate frame, processor 118 sets both "Full Rate Count" and "Erasure Count" to zero. Processor 118 returns to step 202 to wait for the rate decision corresponding to the second frame.

If, for example, processor 116 produces a quarter rate indication in response to the second frame, processor 118 branches in the same manner as in response to the previous frame. Similarly, if processor 116 produces a half rate indication in response to the third frame, processor 118 again branches in the same manner. While processor 116 produces eighth rate, quarter rate, or half rate indications in response to the received frames, processor 118 does not change the power level.

If processor 116 produces a full rate indication in response to the fourth frame, processor 118 branches via steps 208 and 218 to step 222 because the full rate indication follows a variable rate run. At step 222, processor 118 increments "Full Rate Count," which would then be equal to one, and proceeds to step 224. At step 224, processor 118 returns to step 202 because three full rate indications have not been counted.

If processor 116 produces a full rate indication in response to the fifth frame, processor 118 would increment "Full Rate Count" as was described for the fourth frame. Should the sixth frame also be a full rate frame, again via steps 204, 208, 218 and 222 processor 118 would increment "Full Rate Count". Since three full rate indications have now been counted, in step 224 processor 118 branches to step 226 and sets "Full Rate Run" to a value of TRUE and "Variable Rate Run" to a value of FALSE. Processor 118 then returns to step 202.

If processor 116 produces a full rate indication in response to the seventh frame, processor 118 branches via steps 204 and 206 to step 210 because the full rate indication follows a full rate run. At step 210, processor 118 decreases the value "Setpoint". Processor 118 returns to step 202 to wait for the next rate decision.

Comparator 120 compares the received power level signal, which is updated every 1.25 milliseconds, with the power level setpoint signal generated according to the modified value "Setpoint" and produces a deviation signal. In the case where the received power level signal is unchanged or remains above the power level setpoint signal, comparator 120 generates a deviation signal to which the command generator 122 responds by producing a power down command. The base station transmits this command to the mobile station, which decreases the power of the signal that it transmits, so as to reduce the deviation signal.

If processor 116 produces an erasure or full rate likely indication in response to the eighth frame, processor 118 branches to step 216, via steps 204, 206, 212, because the erasure follows a full rate run. At step 216, processor 118 increases the value "Setpoint". Processor 118 returns to step 202 to wait for the next rate decision.

Comparator 120 again compares the received power level signal with the power level setpoint signal generated according to the value "Setpoint" and produces a deviation signal. In the case where the received power level signal is unchanged or is below the power level setpoint signal, comparator 120 generates a deviation signal to which the command generator 122 responds by producing a power up command. The base station again transmits this command to the mobile station, which adjusts the power of the signal that it transmits, so as to reduce the deviation signal.

While processor 118 is in a full rate run state, i.e., "Full Rate Run" is TRUE, and processor 116 produces full rate indications, erasure indications, or full rate likely indications, processor 118 remains in a full rate run state and adjusts the power level as described above to optimize the power of the signal that the mobile station transmits.

If processor 116 produces a half rate indication in the ninth frame, processor 118 branches via steps 204, 206, and 212 to step 214 where "Variable Rate Run" is set to a value of TRUE and "Full Rate Run" set to a value of FALSE. Processor 118 then returns to step 202 to wait for the next rate decision. If processor 116 then produced an erasure indication in response to the tenth frame, processor 118 branches through steps 204, 208, 218 and 228 to step 232. Processor 118 in step 232 increments "Erasure Count," which would then be equal to one, and sets "Erasure Run" to a value of TRUE, sets "Variable Rate Run" to a value of FALSE, and optionally increases the value "Setpoint". Processor 118 then returns to step 202 to wait for the next rate decision.

If processor 116 produces an erasure indication in response to the eleventh frame, processor 118 would branch via steps 204, 208, 220, and 236 to step 240. At step 240, the "Erasure Count" is incremented and then proceeds to step 242. In step 242, since "Erasure Count" is less than 5, processor 118 branches to step 244. In step 244, processor 118 increases the value "Setpoint". Processor 118 returns to step 202 to wait for the next rate decision.

If processor 116 produces erasure indications for the twelfth and thirteenth frames, the steps discussed with reference to the eleventh frame are repeated. However in the fourteenth frame should processor 116 produce an erasure indication, processor 118 then branches via steps 204, 208, 220, and 236 to step 242. In step 242>since "Erasure Count" is equal to 5, processor 118 branches to step 246, In step 246, the value "Setpoint" is increased. Processor 118 then returns to step 202 to wait for the next rate decision.

Although the above discussed processing example does not specifically discuss each step in the processing of FIGS. 3a–3c it is readily determined from these figures other processing examples. Processor 118 continues to execute the power control algorithm as illustrated in FIGS. 3a–3c until it is reset, at which time it returns to step 200.

In sum, the algorithm initially begins in a variable rate run state. The algorithm need not adjust the power level setpoint during the variable rate run state. However, in order to achieve greater control over the power level setpoint, an adjustment is made. The algorithm uses the variable rate run state to enter either a full rate run state if it detects three full rate indications or an erasure run state if it detects one erasure indication.

After entering a full rate run state, the algorithm increases the power level setpoint if it detects an erasure indication or a full rate likely indication so as to result in a generation of a power up command which is transmitted to the mobile station. The algorithm, when in the full rate run state, decreases the power level setpoint if it detects a full rate indication. If, while in the full rate run state, the algorithm detects a half rate indication, a quarter rate indication, or an eighth rate indication, the variable rate run state is entered.

After entering an erasure run state from the variable rate run state, the algorithm increases the power level setpoint if it detects an erasure. If while in the erasure run state the algorithm detects a half rate indication, a quarter rate indication, or an eighth rate indication, a transition to the variable rate run state is made.

In the exemplary invention, the relative size in values of the incremental changes in the value "Setpoint" are as follows. With respect to the increasing setpoint modification values, the value "Delta Up Full Rate" is the largest relative value followed by the "Delta Up Erasure" value, and then the "Delta Up Variable Rate" value. With respect to the decreasing setpoint modification values, the largest relative value is the "Delta Down Full Rate" followed by the "Delta Down Variable Rate." In general the decreasing setpoint values are smaller than the increasing setpoint values.

It should be understood that various modifications to the exemplary diagram of FIGS. 3a–3c may be made and remain within the scope of the invention. For example, since in an embodiment where both the full and half rate frames include a CRC, the diagrams of FIG. 3a–3c need not change. On the other hand, since both full and half rate frames have a CRC, half rate frames may be considered as full rate flames for purposes of modifying the value "Setpoint".

Although the present invention is described in the context of a CDMA cellular communication system, the present invention is equally applicable to other transmission schemes and environments where digital data is transmitted in a frame format. Thus the present invention is not limited by the transmission scheme or environment of a cellular communication system. For example the present invention is applicable to systems such as cellular telephone, personal communications service (PCS) wireless local loop and private branch exchange (PBX). The use in a receiver of pattern detection of the various frame rates and detection of frames in errors for the various patterns provides a flexible scheme for adjusting the transmission power to ensure a quality link for data frames transmitted at the various frame rates. Furthermore, although the present invention is discussed with reference to the absence of transmitted frame rate information, the invention is applicable to those systems in which rate information is transmitted. In the rate transmitted cases the quality of the signal may be used to assist in determining rate data for certain conditions such as erasure and full rate likely frames.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a communications system having a first station and a remotely located second station, said second station transmitting at a predetermined power level a communication signal comprised of frames of data each encoded at a predetermined one of a plurality of data rates, said second station receiving power level information from said first station and responsive thereto for adjusting said power level, a method for controlling said power level, comprising the steps of:
   receiving said communication signal at said first station;
   measuring a power level of said received communication signal;
   producing a rate decision for each frame of data in said received communication signal;
   producing power level information in response to said rate decision and said measured power level; and
   transmitting said power level information to said second station.

2. The method of claim 1, wherein said step of producing said rate decision comprises the steps of:
   decoding each frame of data at each data rate of said plurality of data rates;
   producing at least one error metric for each decoding of each frame at each data rate; and
   determining from said error metrics for each frame an estimate of one of said data rates at which said data was encoded in each respective frame.

3. The method of claim 2 wherein said step of producing said rate decision further comprises the step of determining from said error metrics an erasure frame in which data is corrupted beyond which a determination can be made as to one of said data rates at which said data was encoded in the respective frame.

4. The method of claim 3 wherein said step of producing said rate decision further comprises the step of determining from said error metrics a full rate likely frame in which data is of a highest data rate with corrupted data.

5. The method of claim 4 wherein:
   said rate decision is provided as a full rate indication when said rate at which said data is encoded is of a predetermined highest data rate;
   said rate decision is provided as a half rate indication when said rate at which said data is encoded is about one half said predetermined highest data rate;
   said rate decision is provided as a quarter rate indication when said rate at which said data is encoded is about one fourth said predetermined highest data rate;
   said rate decision is provided as an eighth rate indication when said rate at which said data is encoded is about one eighth said predetermined full rate;

said rate decision is provided as an erasure indication when said rate at which said data is encoded is corrupted beyond which a determination can be made as to one of said data rates at which said data was encoded; and said rate decision provides an full rate likely indication when said rate at which said data is encoded is of said predetermined highest data rate and said data contains bit errors.

6. The method of claim 4 wherein said step of producing power level information in response to said rate decision and said measured power level comprises the steps of:

adjusting a power level setpoint according to each rate decision;

comparing said power level setpoint with said measured power level;

generating a power increase adjustment command when said measured power level is less than said power level setpoint; and generating a power decrease adjustment command when said measured power level is greater than said power level setpoint.

7. The method of claim 6 wherein said step of adjusting said power level setpoint comprises the step of decreasing said power level setpoint by an incremental value when a current frame rate decision is indicative of a frame of data of a highest data rate as following a predetermined number of previous frame rate decisions each indicative of a frame of data at said highest data rate.

8. The method of claim 6 wherein said step of adjusting said power level setpoint comprises the step of increasing said power level setpoint by an incremental value when a current frame rate decision is indicative of a frame of data of one of said erasure frame and said full rate likely frame as following said predetermined number of previous frame rate decisions each indicative of a frame of data at said highest data rate.

9. The method of claim 6 wherein said step of adjusting said power level setpoint further comprises the step of increasing said power level setpoint by an incremental value when a current frame rate decision is indicative of an erasure frame as following a predetermined number of previous frame rate decisions each indicative of an erasure frame.

10. The method of claim 6 wherein said step of adjusting said power level setpoint comprises the steps of:

decreasing said power level setpoint by a first incremental value when a current frame rate decision is indicative of a frame of data of a highest data rate as following a predetermined number of previous frame rate decisions each indicative of a frame of data at said highest data rate; and increasing said power level setpoint by a second incremental value when a current frame rate decision is indicative of a frame of data of one of said erasure frame and said full rate likely frame as following said predetermined number of previous frame rate decisions each indicative of a frame of data at said highest data rate.

11. The method of claim 10 wherein said step of adjusting said power level setpoint further comprises the step of increasing said power level setpoint by a third incremental value when a current frame rate decision is indicative of an erasure frame as following a predetermined number of previous frame rate decisions each indicative of an erasure frame.

12. The method of claim 2 wherein:

said rate decision is provided as a full rate indication when said rate at which said data is encoded is of a predetermined highest data rate;

said rate decision is provided as a half rate indication when said rate at which said data is encoded is about one half said predetermined highest data rate;

said rate decision is provided as a quarter rate indication when said rate at which said data is encoded is about one fourth said predetermined highest data rate; and said rate decision is provided as an eighth rate indication when said rate at which said data is encoded is about one eighth said predetermined highest data rate.

13. The method of claim 1 wherein said step of producing power level information in response to said rate decision and said measured power level comprises the steps of:

adjusting a power level setpoint according to each rate decision;

comparing said power level setpoint with said measured power level; and generating power adjustment commands from each result of said step of comparing.

14. In a communication system in which a first transceiver controls transmission signal power of a second transceiver transmitted communication signal comprised of frames of variable rate data by measuring and comparing a level of signal power of said communication signal with a setpoint power level to generate and communicate power adjustment commands to said second transceiver which is responsive thereto for adjusting signal power in said communication signal, said first transceiver estimating a data rate for each frame of data in said communication signal and providing a corresponding rate decision, a method for adjusting said setpoint power level comprising the steps of:

determining from a set of rate decisions a matching to a predetermined rate decision pattern; and modifying said setpoint power level according to a modification parameter when the matching to said predetermined rate decision pattern is determined.

15. The method of claim 14 further comprising the step of modifying said setpoint power level according to another modification parameter at times other than the matching of said set of rate decisions to said predetermined rate decision pattern.

16. The method of claim 14 further comprising the steps of:

determining from said set of rate decisions a matching to at least one additional predetermined rate decision pattern; and modifying said setpoint power level according to a corresponding additional modification parameter when the matching to a respective one of said predetermined rate decision patterns is determined.

17. The method of claim 16 further comprising the step of modifying said setpoint power level according to a respective one of other additional modification parameter at times other than the matching of said set of rate decisions to said predetermined rate decision pattern and each additional predetermined rate decision pattern.

18. In a communications system having a first station and a remotely located second station, said second station transmitting at a predetermined power level a communication signal comprised of frames of data each encoded at a predetermined one of a plurality of data rates, said second station receiving power level information from said first station and responsive thereto for adjusting said power level, the system for controlling said power level, comprising:

means for determining a power level of said communication signal as received at said first station;

means for producing a rate decision for each frame of data in said received communication signal;

means for producing power level information in response to said rate decision and said determined power level; and means for transmitting said power level information to said second station.

19. The system of claim 18 wherein said means for producing the rate decision decodes each frame of data at each data rate of said plurality of data rates, produces at least one error metrics for each decoding of each frame at each data rate and determines from said error metrics for each frame an estimate of one of said data rates at which said data was encoded in each respective frame.

20. The system of claim 19 wherein said means for producing the rate decision further determines from said error metrics an erasure frame in which data is corrupted beyond which a determination can be made as to one of said data rates at which said data was encoded in the respective frame.

21. The system of claim 20 wherein said means for producing the rate decision further determines from said error metrics a full rate likely frame in which data is of a highest data rate with corrupted data.

22. The system of claim 18 wherein said means for producing power level information comprises:

means for adjusting a power level setpoint according to each rate decision;

means for comparing said power level setpoint with said determined power level; and means for generating power adjustment commands from each power level setpoint and said determined power level comparison result.

* * * * *